US009639819B2

(12) United States Patent
Wada et al.

(10) Patent No.: US 9,639,819 B2
(45) Date of Patent: May 2, 2017

(54) DELIVERY DATE DETERMINATION SYSTEM AND DELIVERY DATE DETERMINATION METHOD

(71) Applicant: NIPPON GAS CO., LTD., Tokyo (JP)

(72) Inventors: Shinji Wada, Tokyo (JP); Shingo Dekamo, Tokyo (JP)

(73) Assignee: Nippon Gas Co., Ltd., Tokyo (JP)

( * ) Notice: Subject to any disclaimer, the term of this patent is extended or adjusted under 35 U.S.C. 154(b) by 0 days.

(21) Appl. No.: 14/405,920

(22) PCT Filed: Jun. 7, 2013

(86) PCT No.: PCT/JP2013/003618
§ 371 (c)(1),
(2) Date: Dec. 5, 2014

(87) PCT Pub. No.: WO2013/183308
PCT Pub. Date: Dec. 12, 2013

(65) Prior Publication Data

US 2016/0196521 A1 Jul. 7, 2016

(30) Foreign Application Priority Data

Jun. 8, 2012 (JP) ................................ 2012-130615

(51) Int. Cl.
*G06Q 10/00* (2012.01)
*G06Q 30/00* (2012.01)
(Continued)

(52) U.S. Cl.
CPC ....... *G06Q 10/06315* (2013.01); *G06Q 10/08* (2013.01); *G06Q 50/06* (2013.01); *G06Q 30/0202* (2013.01); *G06Q 50/28* (2013.01)

(58) Field of Classification Search
CPC .......................... G06Q 30/0202; G06Q 50/06
(Continued)

(56) References Cited

U.S. PATENT DOCUMENTS 6,668,665 B2 * 12/2003 Schimnowski ........... G01F 1/28 73/861.53
2004/0204870 A1 * 10/2004 Schimnowski ......... G01F 1/206 702/45
(Continued)

FOREIGN PATENT DOCUMENTS

JP H03204499 9/1992
JP H08329159 12/1996
(Continued)

OTHER PUBLICATIONS

Akiyama, Toshi, "Remaining Gas Management Function", Electronics, Oct. 1, 1997 (Oct. 1, 1997), vol. 42, No. 10, pp. 50-51 (partial translation is attached).
(Continued)

*Primary Examiner* — Sujay Koneru
(74) *Attorney, Agent, or Firm* — Lee & Hayes, PLLC

(57) ABSTRACT

A delivery server includes: an update unit configured to update a remaining gas amount on a basis of a gas usage obtained based on comparison between a plurality of sets of meter indication data when receiving a set of meter indication data, included in the plurality of sets of meter indication data, of a gas meter configured to detect the gas usage in a gas cylinder; a prediction unit configured to predict a prospective remaining gas amount on a basis of a change in a past gas usage obtained based on comparison between the past gas usages consumed in the gas cylinder; and a determination unit configured to determine a date on which the predicted remaining gas amount reaches a predetermined value as a delivery date of the gas cylinder.

2 Claims, 10 Drawing Sheets d30

| CUSTOMER ID (d31) | METER NUMBER (d32) | • • • | GAS CYLINDER CAPACITY (d33) | NUMBER OF CYLINDERS (d34) | ENTIRE/HALF CLASSIFICATION (d35) | AREA CODE (d36) |
|---|---|---|---|---|---|---|
| A0001 | 56AB001 | • • • | 50kg | 1 | 1 | 18 |
| A0001 | 56AB002 | • • • | 50kg | 2 | 2 | 18 |
| A0003 | 56AB003 | • • • | 30kg | 1 | 1 | 19 |
| ⋮ | ⋮ | ⋮ | ⋮ | ⋮ | ⋮ | ⋮ |

(51) Int. Cl.

| | |
|---|---|
| *G06Q 10/06* | (2012.01) |
| *G06Q 50/06* | (2012.01) |
| *G06Q 10/08* | (2012.01) |
| *G06Q 30/02* | (2012.01) |
| *G06Q 50/28* | (2012.01) |

(58) Field of Classification Search
USPC ................................ 705/7.31, 413; 700/291
See application file for complete search history.

(56) References Cited

U.S. PATENT DOCUMENTS

| | | | | |
|---|---|---|---|---|
| 2006/0033618 | A1* | 2/2006 | Miller .................... | G08B 13/00 340/568.1 |
| 2006/0036515 | A1* | 2/2006 | Ingalsbe ............. | G06Q 10/087 705/28 |
| 2006/0161310 | A1* | 7/2006 | Lal ........................... | H02J 3/00 700/295 |
| 2008/0033668 | A1 | 2/2008 | Humphrey | |
| 2010/0241277 | A1* | 9/2010 | Humphrey ............. | G01F 23/00 700/282 |
| 2011/0161251 | A1 | 6/2011 | Carey et al. | |
| 2012/0185197 | A1* | 7/2012 | Lorden .................. | G01F 9/001 702/100 |

FOREIGN PATENT DOCUMENTS

| | | |
|---|---|---|
| JP | H11211534 | 8/1999 |
| JP | 2001266279 | 9/2001 |
| JP | 2002074571 | 3/2002 |
| JP | 200930671 | 2/2009 |
| JP | 2010144751 | 7/2010 |

OTHER PUBLICATIONS

Office Action dated Jan. 16, 2015 in corresponding Australian Patent Application No. 2013273029, 6 pages.

International Preliminary Examination Report on Patentability mailed Dec. 18, 2014 for PCT application No. PCT/JP2013/003618, 7 pages.

PCT Search Report mailed Jul. 23, 2013 for PCT application No. PCT/JP2013/003618, 2 pages.

Office Action dated Dec. 18, 2015 in corresponding Canadian Patent Application No. 2,873,414, 4 pages.

* cited by examiner d30

| CUSTOMER ID (d31) | METER NUMBER (d32) | ... | GAS CYLINDER CAPACITY (d33) | NUMBER OF CYLINDERS (d34) | ENTIRE/HALF CLASSIFICATION (d35) | AREA CODE (d36) |
|---|---|---|---|---|---|---|
| A0001 | 56AB001 | ... | 50kg | 1 | 1 | 18 |
| A0001 | 56AB002 | ... | 50kg | 2 | 2 | 18 |
| A0003 | 56AB003 | ... | 30kg | 1 | 1 | 19 |
| ... | ... | ... | ... | ... | ... | ... |

FIG.3 d40

| CUSTOMER ID | METER NUMBER | REMAINING GAS AMOUNT | REPLACEMENT FLAG |
|---|---|---|---|
| A0001 | 56AB001 | 35.6m³ | 1 |
| A0001 | 56AB002 | 26.6m³ | |
| A0003 | 56AB003 | 10.6m³ | 1 |
| ⋮ | ⋮ | ⋮ | ⋮ | d41 d42 d43 d44

FIG.4

| CUSTOMER ID | AREA CODE | CUSTOMER ID | METER NUMBER | METER READING DATE | METER INDICATION | --- |
|---|---|---|---|---|---|---|
| --- | 18 | A0001 | 56AB321 | 2012/3/30 | 235.2 | --- |
| --- | 18 | A0002 | 56AB222 | 2012/3/30 | 200.5 | --- |
| --- | 18 | A0003 | 56AB001 | 2012/3/30 | 210.3 | --- |
| ⋮ | ⋮ | ⋮ | ⋮ | ⋮ | ⋮ | ⋮ | d80

EXAMPLE OF PREVIOUS YEAR'S RECORD OF CUSTOMER A0001

| JANUARY | FEBRUARY | MARCH | — — — |
|---|---|---|---|
| 4.0 | 4.2 | 3.0 | |

$\alpha = \frac{4.2}{4.0}$ $\alpha = \frac{3.0}{4.2}$

FIG.8 d100

EXAMPLE OF PREVIOUS YEAR'S RECORD OF AREA 18

| JANUARY | FEBRUARY | MARCH | --- |
|---|---|---|---|
| 3.8 | 4.0 | 3.0 | |

$\beta = \frac{4.0}{3.8}$ $\beta = \frac{3.0}{4.0}$

FIG.10

DELIVERY DATE DETERMINATION SYSTEM AND DELIVERY DATE DETERMINATION METHOD

TECHNICAL FIELD

The present invention relates to a system and a method of determining a delivery date of a gas cylinder for liquefied petroleum (LP) gas installed in a supply facility.

BACKGROUND ART

It is known that supply of LP gas is based on import from gas producing countries and domestic production as by-product in the course of producing petroleum products. Petroleum refining terminals and import terminals for storing LP gas carried from gas producing countries by tankers are respectively referred to as primary terminals. LP gas is loaded into domestic vessels and/or tank trucks in the primary terminals and is shipped to secondary terminals located on the coast or inland as hub terminals for LP gas transportation. Further, LP gas carried to the secondary terminals is transported to LP gas filling stations in various locations, i.e., delivery branches, and is then injected into gas cylinders (gas canisters) in the delivery branches.

The gas cylinders, filled with LP gas in the respective filling stations, are delivered to customers' places such as residential houses, apartment houses and work places by deliverymen. Empty gas cylinders in the customers' places are replaced with full gas cylinders, and are brought back to the respective filling stations. In each filling station, a fixed delivery area is assigned to each deliveryman as an area of which he/she is in charge. Each deliveryman is given delivery tickets to be delivered to customers' places within his/her responsible delivery area in 2 to 10 days.

The delivery tickets are created by a delivery manager. First, the amount of LP gas remaining in each gas cylinder is predicted based on a past gas usage history of each customer, a meter indication of a gas meter in each customer's place, a delivery history and so forth, and the next delivery due date of each gas cylinder is determined. The number of gas cylinders to be delivered in 2 to 10 days is determined by accumulating the number of gas cylinders of all the customers within the delivery area of which each deliveryman is in charge.

In replacing a gas cylinder based on a delivery ticket, a deliveryman fills in the respective items of the delivery ticket including a replacement date, a meter indication on the date, a cylinder number and a safety inspection. When a daily delivery work is finished, delivery tickets are handed in to the delivery manager. The delivery manager checks if each delivery ticket returned to him/her includes incomplete items, and then, stores each checked delivery ticket as data for calculating the next delivery due date. Under the aforementioned mechanism, a system for enhancing efficiency in delivery of a gas cylinder has been proposed (see PTL 1).

As disclosed in PTL 1, a system for enhancing efficiency in delivery of a gas cylinder has conventionally existed, but has had a problem that in delivering a gas cylinder, it has been impossible for the system to determine a delivery date of the gas cylinder such that gas delivery can be stably supplied and further the remaining amount of gas to be brought back can be reduced.

CITATION LIST

Patent Literature

PTL 1: Japanese Patent Laid Open No. H08-329159 (1996)

SUMMARY OF INVENTION

In view of the aforementioned situation, it is an object of the present invention to provide a delivery date determination system and a delivery date determination method whereby it is possible to determine a delivery date of a gas cylinder such that gas delivery can be stably supplied and further the remaining amount of gas to be brought back can be reduced.

To solve the aforementioned problem, the present invention relates to a delivery date determination system of determining a delivery date of each of a plurality of gas cylinders in a plurality of supply facilities. The delivery date determination system comprises: a management unit configured to manage a remaining gas amount in the each of the plurality of gas cylinders installed in the plurality of supply facilities; an update unit configured to update the remaining gas amount managed by the management unit on a basis of a gas usage obtained based on comparison between a plurality of sets of meter indication data when receiving a set of meter indication data, included in the plurality of sets of meter indication data, of one or more of a plurality of gas meters configured to detect the respective gas usages in the plurality of gas cylinders; a prediction unit configured to predict a prospective remaining gas amount by reducing the updated remaining gas amount on a basis of a change in a past gas usage obtained based on the plurality of sets of meter indication data of the each of the plurality of gas cylinders; and a determination unit configured to determine a date on which the predicted remaining gas amount reaches a predetermined value as the delivery date of the each of the plurality of gas cylinders in the plurality of supply facilities.

To solve the aforementioned problem, the present invention relates to a delivery date determination method of causing a computer to determine a delivery date of each of a plurality of gas cylinders in a plurality of supply facilities, wherein the computer includes a management unit configured to manage a remaining gas amount in the each of the plurality of gas cylinders installed in the plurality of supply facilities and a past gas usage consumed in the each of the plurality of gas cylinders. The delivery date determination method comprises the steps of: updating the remaining gas amount managed by the management unit on a basis of a gas usage obtained based on comparison between a plurality of sets of meter indication data when receiving a set of meter indication data, included in the plurality of sets of meter indication data, of one or more of a plurality of gas meters configured to detect the respective gas usages in the plurality of gas cylinders; predicting a prospective remaining gas amount by reducing the updated remaining gas amount on a basis of a change in a past gas usage obtained based on the plurality of sets of meter indication data of the each of the plurality of gas cylinders; and determining a date on which the predicted remaining gas amount reaches a predetermined value as the delivery date of the each of the plurality of gas cylinders in the plurality of supply facilities.

According to the present invention, it is possible to determine a delivery date of a gas cylinder such that gas delivery can be stably supplied, and further, the remaining amount of gas to be brought back can be reduced.

BRIEF DESCRIPTION OF DRAWINGS

FIG. 3 is a diagram showing an exemplary configuration of customer information stored in a storage device of the delivery server according to the exemplary embodiment of the present invention;

FIG. 4 is a diagram showing an exemplary configuration of information that includes a remaining gas amount and is stored in the storage device of the delivery server according to the exemplary embodiment of the present invention;

FIG. 8 is a diagram for explaining a previous year's record of the gas usage of a customer in the exemplary embodiment of the present invention;

FIG. 10 is a diagram for explaining a previous year's record of the gas usage within an area in the exemplary embodiment of the present invention.

DESCRIPTION OF EMBODIMENTS

Explanation will be hereinafter provided for a schematic configuration of a system in the present exemplary embodiment. The system is configured to determine a delivery date of a gas cylinder installed in a supply facility with use of meter indication data including a meter indication of a gas meter.

Figure 1:
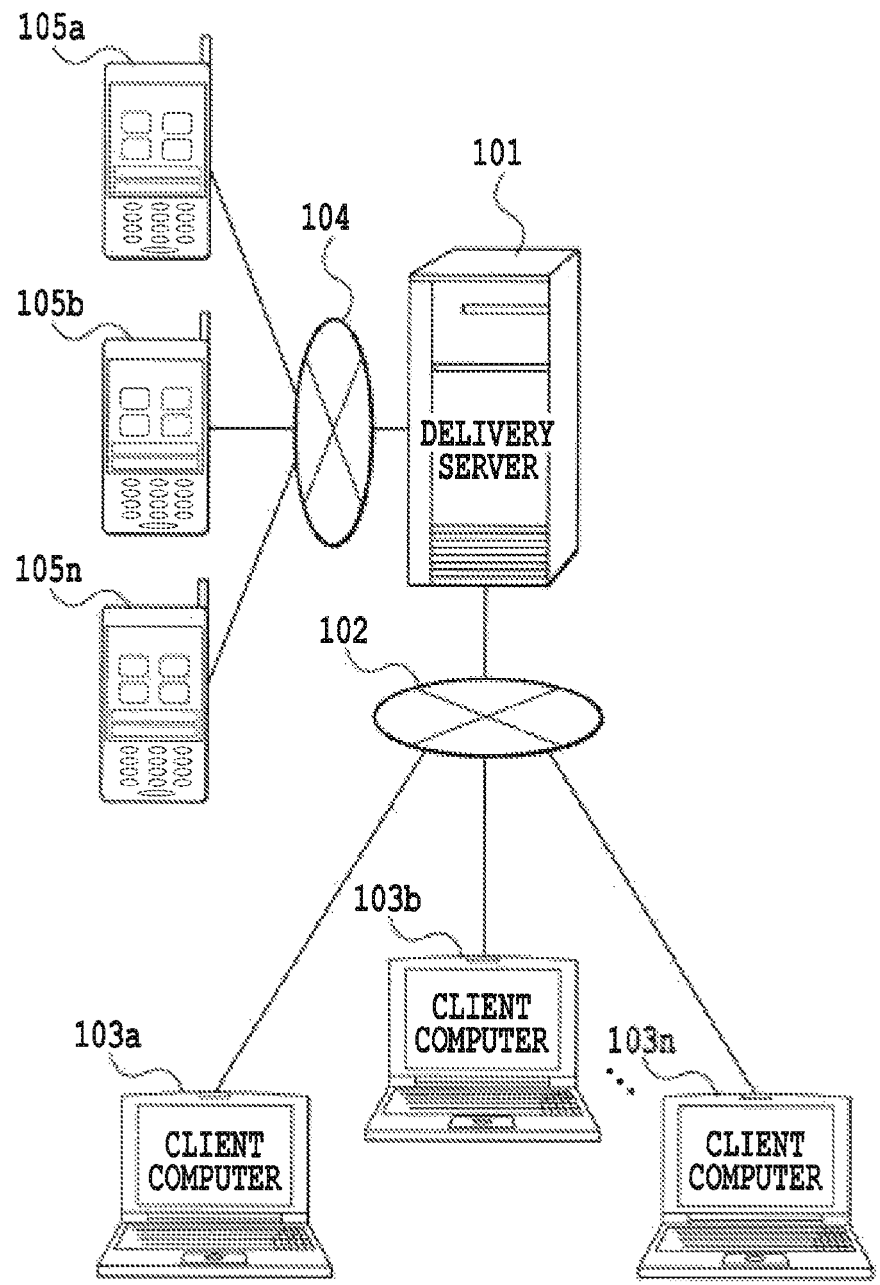
FIG. 1 is a diagram showing an exemplary network configuration according to an exemplary embodiment of the present invention.

FIG. 1 is a diagram showing a network configuration according to the exemplary embodiment of the present invention. In FIG. 1, a delivery server (delivery determination system) 101 is configured to be communicative with multiple client computers 103*a*, 103*b* . . . 103*n* through a network 102. Further, the delivery server 101 is configured to be communicative with multiple mobile terminals (communication terminals) 105*a*, 105*b* . . . 105*n* through a network 104. It should be noted that the multiple client computers 103*a*-103*n* are simply referred to as client computers 103 when explained in common, whereas the multiple mobile terminals 105*a*-105*n* are simply referred to as mobile terminals 105 when explained in common.

The client computers 103 are terminals located in a delivery center of managing deliveries from the respective delivery branches in a unified manner, for instance, and are used by users in the delivery center. A user establishes a connection to the delivery server 101 through a client computer 103 and exclusively performs various delivery works such as confirmation of a delivery status and an instruction of creating delivery data. It should be noted that the client computers 103 may be located in, for instance, delivery branches or so forth.

The mobile terminals 105 are used by workers (including e.g., meter readers, deliverymen, safety inspectors, etc.) who read meter indications of gas meters respectively installed in the supply facilities equipped with gas cylinders. The mobile terminals 105 respectively include a CPU, a memory, an input device, a display device and so forth. The aforementioned workers collect sets of meter indication data, respectively including a meter indication of each gas meter, through the mobile terminals 105 and transmit the collected sets of meter indication data to the delivery server 101. It should be noted that each set of meter indication data is transmitted to the delivery server 101, for instance, when reading a gas meter, when opening/closing a valve, when conducting a safety inspection, when delivering one or more gas cylinders and so forth.

Configuration of Delivery Server

Figure 2:
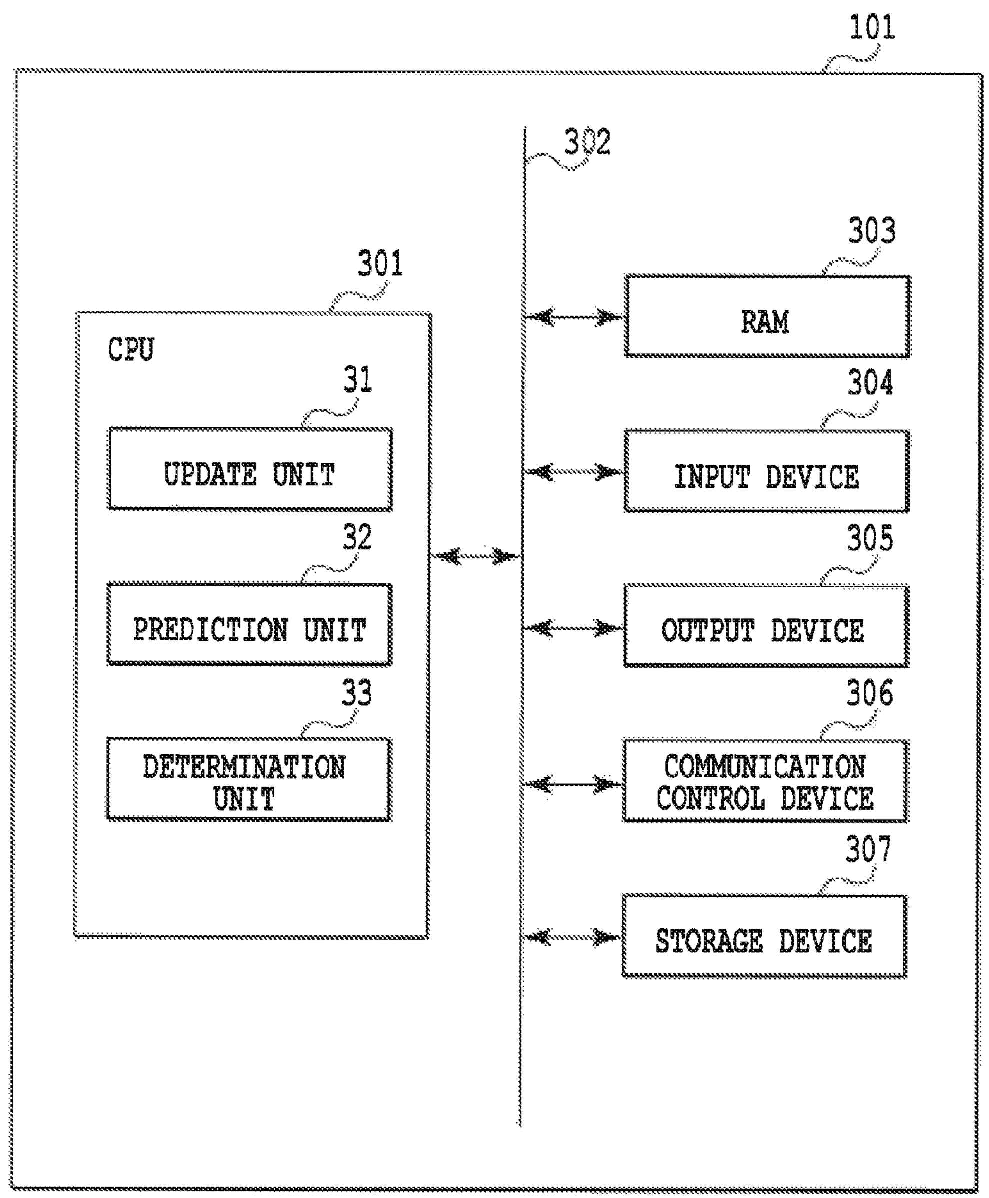
FIG. 2 is a block diagram showing an exemplary configuration of a delivery server according to the exemplary embodiment of the present invention.

FIG. 2 is a block diagram showing an exemplary configuration of the delivery server 101. It should be noted that FIG. 2 explains a configuration employing a single computer system, but the delivery server 101 may be configured as a part of a multifunctional distribution system comprising multiple computer systems.

As shown in FIG. 2, the delivery server 101 includes a CPU 301, a system bus 302, a RAM 303, an input device 304, an output device 305, a communication control device 306 and a storage device (management unit) 307.

The CPU 301 is coupled to the respective component elements through the system bus 302, and is configured to perform a process of transferring control signals and data. Also, the CPU 301 is configured to run various software programs and perform arithmetic/logic processing and so forth in order to implement the entire operation of the delivery server 101.

The RAM 303 has a work area for storing temporarily data and the software programs.

The storage device 307 includes a non-volatile storage medium such as a ROM or a HDD, and has a program storage area for storing the software programs and a data storage area for storing data to be obtained on an as-needed basis, data as processing results, and so forth. For example, a software program is retrieved from the program storage area of the storage device 307 into the work area of the RAM 303, and is run by the CPU 301. Thus, the CPU 301 of the present exemplary embodiment implements functions of respective units 31 to 33 to be described.

As shown in FIG. 2, the CPU 301 includes an update unit 31, a prediction unit 32 and a determination unit 33. The update unit 31 is configured to update the remaining gas amount in the gas cylinder stored in the storage device 307, when receiving meter indication data of a gas meter that detects the gas usage in a gas cylinder. In the present exemplary embodiment, the meter indication data includes a meter indication indicating the gas usage in the gas cylinder. Thus, the update unit 31 is configured to calculate the remaining gas amount in the same gas cylinder by, for instance, calculating the gas usage on the basis of {(a meter indication on the current meter reading date)−(a meter indication on the previous meter reading date)}. In other words, the process of updating the remaining gas amount is configured to be performed based on the gas usage obtained based on a comparison between multiple sets of meter indication data including the aforementioned received meter indication data. Detailed explanation will be provided below for the process of updating the remaining gas amount.

The prediction unit 32 is configured to predict a prospective remaining gas amount by reducing the remaining gas amount updated by the update unit 31 on the basis of change in the past gas usage obtained based on the sets of meter indication data of the gas cylinder. In the present exemplary embodiment, a ratio between a daily gas usage on the same month as the current meter indication month in the previous year and a daily gas usage on the same month as the next month of the current meter indication month in the previous year is used as an exemplary change in gas usage. Detailed explanation will be provided below for the prediction processing.

The determination unit 33 is configured to determine a date, on which the remaining gas amount predicted by the prediction unit 32 reaches a predetermined value, as the delivery date of the gas cylinder in each supply facility. Detailed explanation will be provided below for the determination processing.

FIG. 3 is a diagram showing an exemplary configuration of customer information d30 stored in the storage device 307 of the delivery server 101. As shown in FIG. 3, items stored in the storage device 307 include "customer ID" d31 for identifying each customer, "meter number" d32 for identifying each gas meter, and so forth. Further, items stored in the storage device 307 include "gas cylinder capacity" d33 indicating the capacity of each gas cylinder, "number of cylinders" d34 indicating the number of gas cylinders installed in each supply facility, "entire/half classification" d35 indicating whether or not a gas cylinder group composed of two banks of one or more gas cylinders should be entirely replaced, and "area code" d36 for identifying each area that one or more supply facilities are located. In the example of FIG. 3, "1" is set as the value of "entire/half classification" d35 when entire replacement is performed, whereas "2" is set as the value of "entire/half classification" d35 when half replacement is performed. When "1" indicating entire replacement is set, this means that the first bank of gas cylinder (or cylinders) is also replaced when the second bank of gas cylinder (or cylinders) is replaced. When "2" indicating half replacement is set, this means that the gas cylinders are replaced one by one.

For example, when predicting the remaining gas amount in the first bank of gas cylinder (or cylinders) in the gas cylinder group intended for entire replacement, the CPU 301 is configured to predict the remaining gas amount in the second bank of gas cylinder (or cylinders) in accordance with the calculated gas usage. In this case, the remaining gas amount is predicted based on a safety factor s. For example, the safety factor s is set in consideration of the capacity of a gas cylinder and previous delivery weight (usage record). For example, when the safety factor s has been preliminarily set to be 20% and the total capacity of the first and second banks of gas cylinders in a previous delivery is 400 kg, the CPU 301 determines that the total capacity of the first and second banks of gas cylinders in the previous delivery, i.e., an available remaining amount, is 320 kg on the basis of calculation of $(400\ \text{kg}\times(100-s)/100)$.

FIG. 4 is a diagram showing an exemplary configuration of information including the remaining gas amount stored in the storage device 307 of the delivery server 101. As shown in a table d40 of FIG. 4, items stored in the storage device 307 include the aforementioned "customer ID" d41, the aforementioned "meter number" d42, "remaining gas amount" d43 and "replacement flag" d44. The "remaining gas amount" d43 indicates the remaining gas amount in each gas cylinder currently used. The "replacement flag" d44 is information indicating whether or not the currently used gas cylinder should be replaced when the remaining gas amount of the currently used gas cylinder reaches a predetermined value. For example, as to half replacement where two gas cylinders are installed in a supply facility, gas may be supplied from the second gas cylinder when the first gas cylinder becomes empty (if an automatic switch device is installed). Thus, a replacement flag is required for determining whether or not gas cylinder delivery is required. In the "replacement flag" d44, "1" indicates that the currently used gas cylinder is intended for replacement.

Operation of Delivery Server

Figure 5:
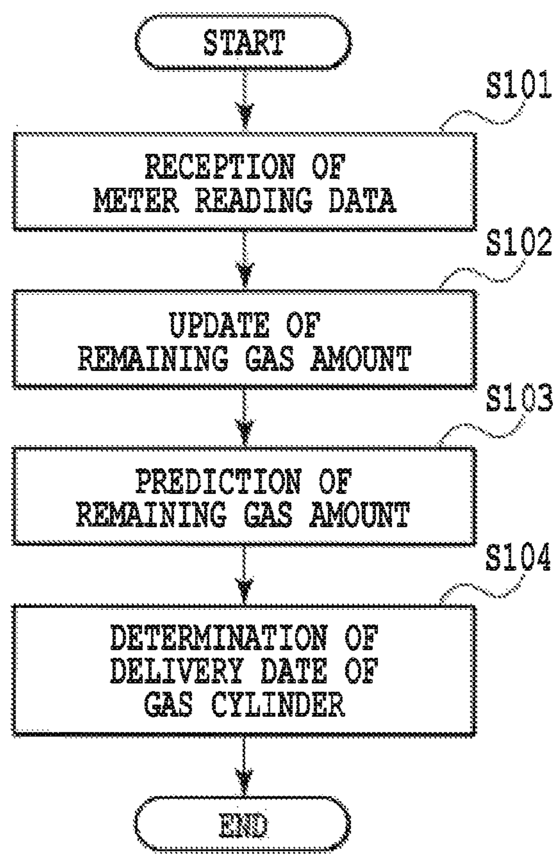
FIG. 5 is a flowchart showing an exemplary entire operation of the delivery server according to the exemplary embodiment of the present invention.
Figure 6:
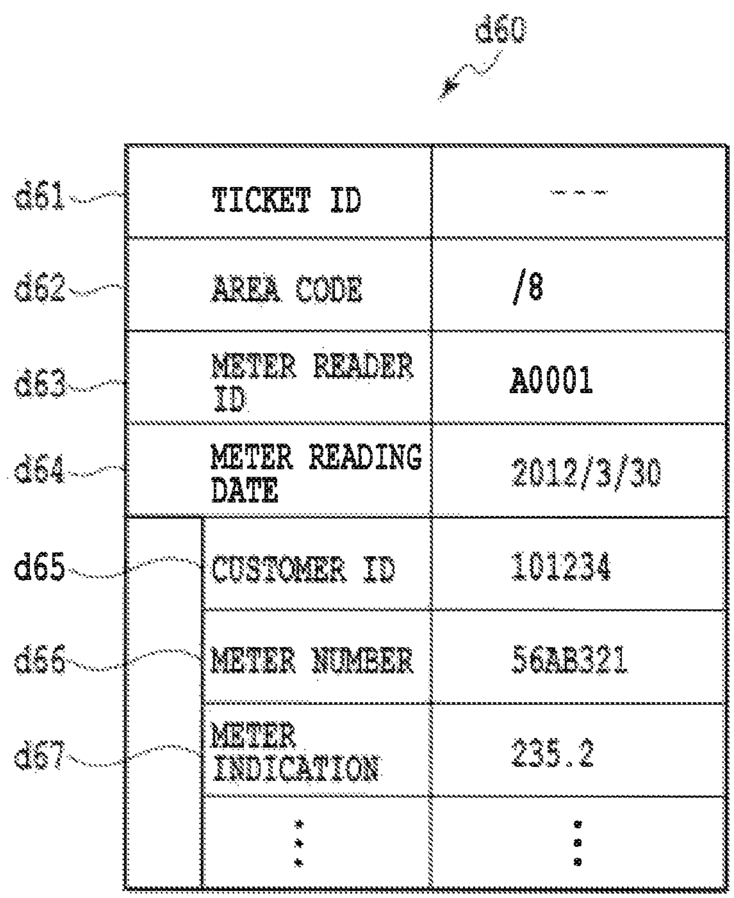
FIG. 6 is a diagram showing exemplary meter indication data in the exemplary embodiment of the present invention.
Figure 7:
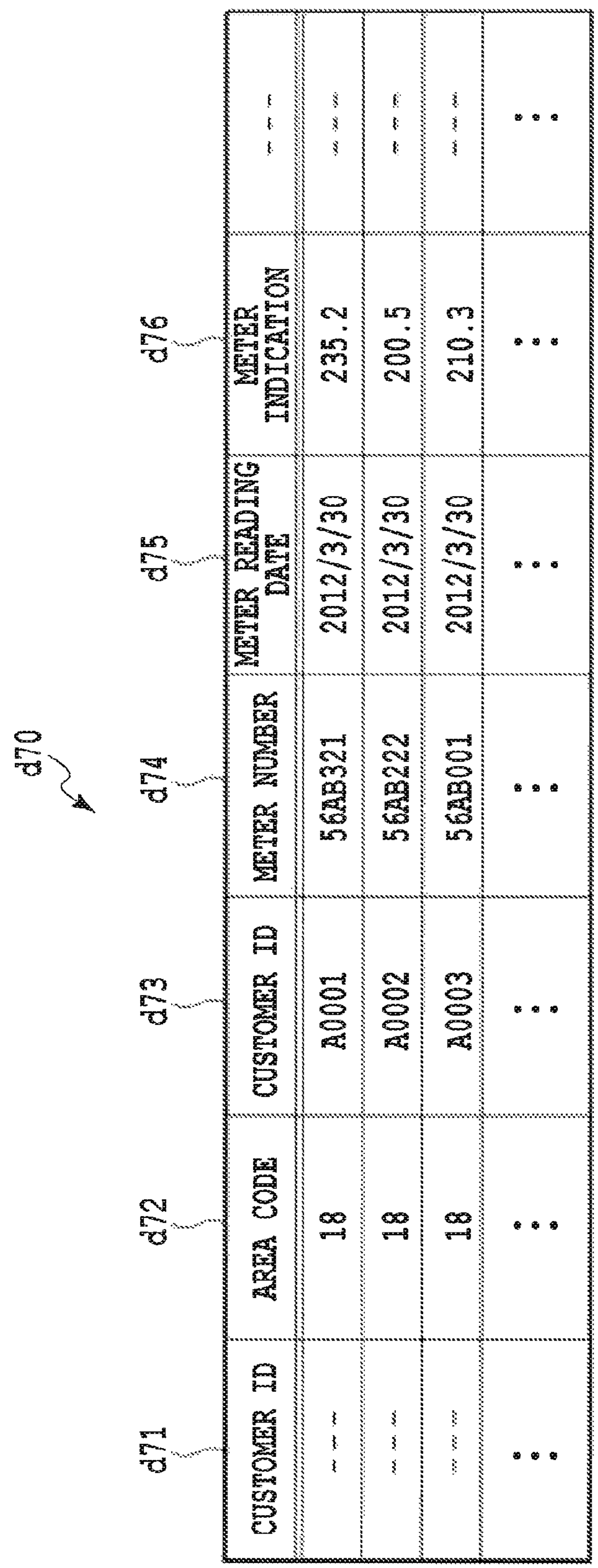
FIG. 7 is a diagram showing an exemplary data structures of multiple sets of meter indication data stored in the storage device of the delivery server according to the exemplary embodiment of the present invention.
Figure 9:
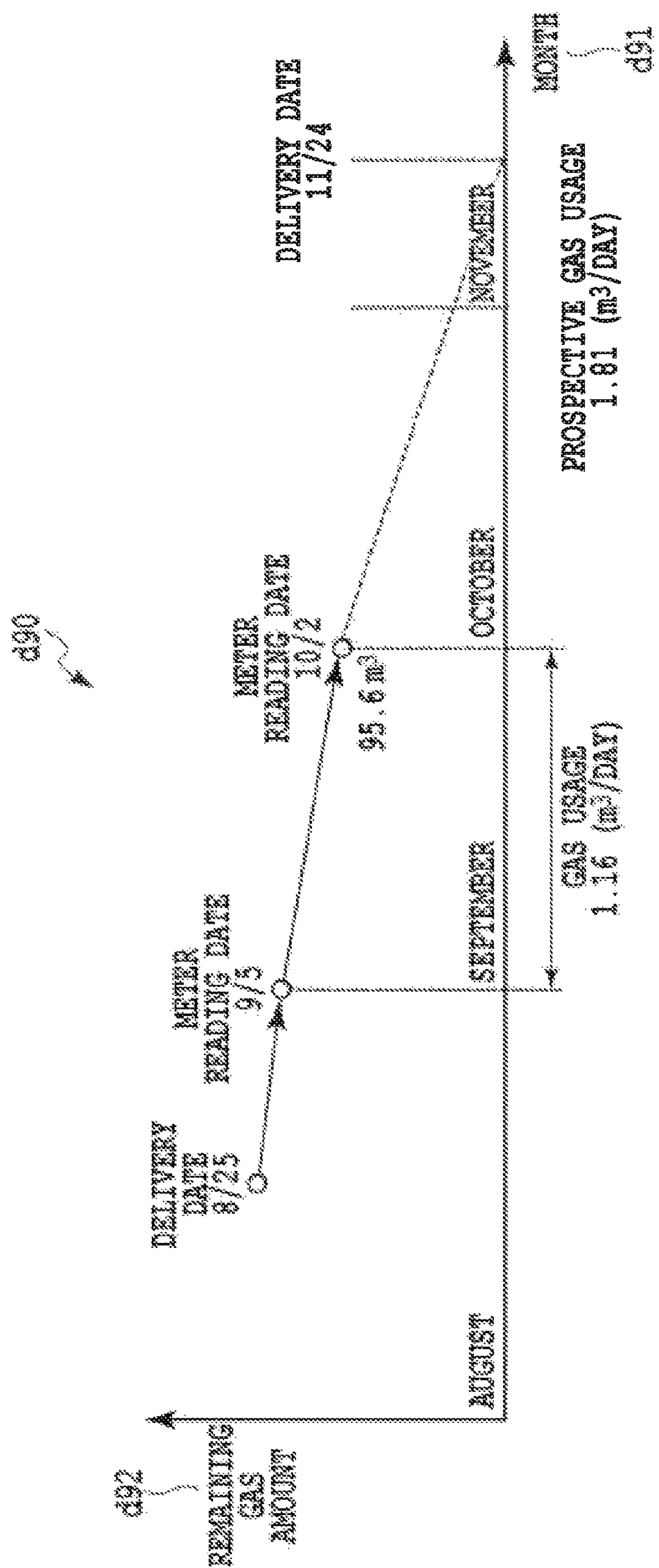
FIG. 9 is a diagram for explaining a schematic time-series procedure of determining a delivery date of a gas cylinder after reading of a gas meter.

Next, with reference to FIGS. 5 to 9, explanation will be provided for a method of determining a delivery date of a gas cylinder on the basis of the remaining gas amount in the gas cylinder predicted by use of meter indication data of a gas meter when the meter indication data is transmitted to the delivery server 101 from a terminal 105. FIG. 5 is a flowchart showing an exemplary entire operation of the delivery server 101. FIG. 6 is a diagram showing exemplary meter indication data. FIG. 7 is a diagram showing an exemplary data structures of multiple sets of meter indication data stored in the storage device 307 of the delivery server 101. FIG. 8 is a diagram for explaining a record of the gas usage of a customer in the previous year. FIG. 9 is a diagram for explaining a schematic time-series configuration of determining a delivery date of the gas cylinder after reading of the gas meter.

As an example, FIGS. 5 to 9 show an exemplary case that the delivery server 101 receives meter indication data in reading the gas meter. However, the delivery server 101 may be configured to receive meter indication data in opening/closing a valve, in conducting a safety inspection or in delivering the gas cylinder.

In FIG. 5, firstly, when the mobile terminal 105 transmits meter indication data of the gas meter to the delivery server 101, the CPU 301 (the update unit 31) of the delivery server 101 receives the meter indication data (S101). Now, FIG. 6 shows exemplary meter indication data to be transmitted from the mobile terminal 105.

As shown in FIG. 6, meter indication data d60 includes meter reading ticket ID d61, area code d62, meter reader ID d63, meter reading date d64, customer ID d65, meter number d66, meter indication d67 and so forth. In the present exemplary embodiment; a QR code (registered trademark) (readable information code), for instance, is attached to the gas meter. Hence, the mobile terminal 105 is configured to be capable of obtaining meter indication data excluding a meter indication and a meter reading date by reading the QR code (registered trademark). It should be noted that the meter indication is obtained based on, for instance, an input operation by a meter reader, whereas the date on which the QR code (registered trademark) is read, for instance, is set as the meter reading date.

When receiving the meter indication data, the delivery server 101 is configured to cause the storage device 307 to store the meter indication data. FIG. 7 shows exemplary stored data.

As shown in a table d70 of FIG. 7, multiple sets of meter indication data, received by the CPU 301, are stored in the storage device 307. The table d70 includes customer ID d71, area code d72, customer ID d73, meter number d74, meter reading date d75 and meter indication d76.

In S102 of FIG. 5, the CPU 301 (the update unit 31) is configured to update the remaining gas amount in the gas cylinder managed by the storage device 307 on the basis of a gas usage A ($m^3$) obtained by a comparison between multiple sets of meter indication data including the meter indication data received in S101.

In this case, the CPU 301 is configured to read the multiple sets of meter indication data including the aforementioned received current meter indication data from the storage device 307 and calculate the gas usage A ($m^3$) consumed in the same gas cylinder on the basis of difference between the meter indications in the multiple sets of meter indication data. In the present exemplary embodiment, for instance, the CPU 301 is configured to calculate the gas usage A ($m^3$) consumed in a period from the previous meter reading date to the current meter reading date on the basis of difference between the meter indication of the current meter indication data and that of the previous meter indication data. Then, the CPU 301 is configured to subtract the gas usage A ($m^3$) from the remaining gas amount in the gas cylinder managed by the storage device 307 and set the post-subtraction value as "the remaining gas amount" in the storage device 307. Accordingly, the amount of gas remaining in the gas cylinder at the current meter reading is set.

In should be noted that in S102, for example, when determining that one gas cylinder as a supply-side gas cylinder should not be replaced (when the replacement flag is not set) on the basis of the replacement flag of the storage device 307, and further, when changing the target for updating from the remaining gas amount in the supply-side gas cylinder to that in another unused gas cylinder, i.e., a reserve-side gas cylinder, the CPU 301 (the update unit 31) is configured to calculate and determine the remaining gas amount in the reserve-side gas cylinder on the basis of the gas capacity of the reserve-side gas cylinder managed by the storage device 307. For example, when the gas capacity of the reserve-side gas cylinder is 50 kg, the CPU 301 is configured to calculate the remaining gas amount in the reserve-side gas cylinder by subtracting the gas usage, which is consumed in the reserve-side gas cylinder after the gas in the supply-side gas cylinder is used up, from the gas capacity (50 kg) of the reserve-side gas cylinder.

In S103 of FIG. 5, the CPU 301 (the prediction unit 32) is configured to predict a prospective remaining gas amount by reducing the remaining gas amount updated in S102 on the basis of change in the past gas usage obtained based on the aforementioned meter indication data of the gas cylinder intended for prediction. First, the CPU 301 is configured to calculate a rate of change in the gas usage consumed in the gas cylinder in the past on the basis of comparison between the gas usages in a predetermined period before the meter reading date of the meter indication data received in S101. In the present exemplary embodiment, for instance, values (the meter indications of the meter indication data) in the past on the same time as the meter reading date of the meter indication data are used as the gas usages intended for comparison. In this case, the CPU 301 is configured to read multiple sets of meter indication data intended for comparison from the storage device 307 and calculate the rate of change in the gas usage on the same time as the meter reading date on the basis of difference between the meter indications in the respective sets of meter indication data.

For example, when the current meter reading of the gas meter is performed in February, the daily gas usage in February in the previous year and the daily gas usage in March in the previous year are used as the gas usages of a predetermined period. In this case, the CPU 301 is configured to calculate a value of {(the daily gas usage in March in the previous year)/(the daily gas usage in February in the previous year)} on the basis of multiple sets of intended meter indication data and to set the calculated value as the rate of change in the gas usage consumed in the past.

It should be noted that (the daily gas usage in February in the previous year) is calculated by, for instance, a formula {(a meter indication of meter indication data in March in the previous year)−(a meter indication of meter indication data in February in the previous year)}/(the number of days from a meter reading date in February in the previous year to a meter reading date in March in the previous year), whereas (the daily gas usage in March in the previous year) is calculated by, for instance, a formula {(a meter indication of meter indication data in April in the previous year)−(the meter indication of the meter indication data in March in the previous year)}/(the number of days from the meter reading date in March in the previous year to a meter reading date in April in the previous year).

In an example d80 of FIG. 8, the daily gas usage in February in the previous year is indicated as 4.2 ($m^3$/day), whereas the daily gas usage in March in the previous year is indicated as 3.0 ($m^3$/day). Thus, the rate of change calculated by the CPU 301, i.e., the rate of change $\alpha$ in the gas usage on the same time as the meter reading date, is "$\alpha$=3.0/4.2". It should be noted that in FIG. 8, the rate of change $\alpha$ in the daily gas usage from January to February in the previous year is indicated as "$\alpha$=4.2/4.0". Accordingly, the rate of increase or decrease $\alpha$ in the daily gas usage on the same time in the previous year is obtained.

It should be noted that the meter indications of the meter indication data in the previous year are employed as the past values on the same time as the meter reading date of the meter indication data. However, meter indications of meter indication data of two or more previous years may be employed instead. In this case, rates of change in gas usage may be calculated for the respective years, and an average of the rates of change may be set as the rate of change calculated by the CPU 301, i.e., the rate of change $\alpha$ in the gas usage in the past on the same time as the meter reading date.

Further, in S103 of FIG. 5, the CPU 301 (the prediction unit 32) is configured to modify the daily gas usage calculated based on the gas usage A ($m^3$) calculated in S102, i.e., the gas usage N ($m^3$/day) from the previous meter reading date to the current meter reading date, in accordance with the aforementioned rate of change $\alpha$ in the gas usage. In this case, the CPU 301 is configured to multiply the rate of change $\alpha$ in the gas usage (e.g., $\alpha$=3.0/4.2) and the aforementioned gas usage N ($m^3$/day) and set a gas usage ($m^3$/day) obtained by $\alpha \times N$ as a modified gas usage, i.e., a prospective gas usage. It should be noted that the aforementioned gas usage N ($m^3$/day) is calculated by a formula of {the gas usage A ($m^3$)/(the number of days from the previous reading date to the current meter reading date)}.

Then, the CPU 301 (the prediction unit 32) is configured to predict a prospective change in remaining gas amount on and after meter reading by subtracting the modified gets usage $\alpha N$ ($m^3$/day) from the remaining gas amount updated in S102.

Alternatively in S103, the CPU 301 may be configured to predict the gas usage to be consumed by the customer on and after the meter reading date on the basis of an installation status of gas consuming equipment as a customer-dependent factor and/or a gas usage season as an external factor. For example, a GHP (gas heat pump) air conditioner, a heater and a cooler are exemplified as the gas consuming equipment.

In installing gas consuming equipment anew, a rate of increase d (e.g., d=1.2) in the gas usage, which can be increased from the date (e.g., May 10, 2012) to start using the gas consuming equipment, has been preliminarily set. The CPU 301 is configured to modify the gas usage N ($m^3$/day) calculated in S102 in accordance with the rate of change $\alpha$ in the gas usage and the rate of increase d and determine that the gas consumption from e.g., May 10, 2012 is a value obtained by $\alpha \times d \times N$.

On the other hand, in removing already installed gas consuming equipment, the rate of increase d (e.g., d=1.2) in the gas usage, which has been preliminarily set, will be no longer used from the date (e.g., May 10, 2012) that the gas consuming equipment is removed. The CPU 301 is configured to determine that the gas consumption from e.g., May 10, 2012 is a value obtained by $\alpha \times N$.

In changing already installed gas consuming equipment, the rate of increase d in the gas usage is updated in accordance with the change condition. The CPU 301 is configured to modify the aforementioned gas usage N ($m^3$/day) in accordance with the rate of change $\alpha$ in the gas usage and the updated rate of increase d and determine that the gas consumption amount from the change date of the gas consuming equipment (e.g., May 10, 2012) is a value obtained by $\alpha \times d \times N$.

Prediction of the gas usage based on a gas usage season is performed based on a predetermined reference value r. For example, the reference value r (e.g., r=1.5~1.1) has been preliminary set for a cooling season (e.g., June to September) or a heating season (e.g., December to February). The CPU 301 is configured to calculate the gas usage consumed by the customer on and after the meter reading date on the basis of the reference value r set for either the cooling season or the heating season.

It should be noted that the aforementioned rate of increase d or reference value r is stored in the storage device 307 of the delivery server 101 so as to be associated with the customer ID and the meter number.

In S104 of FIG. 5, the CPU 301 (the determination unit 33) is configured to determine the date that the remaining gas amount predicted in S103 reaches a predetermined value as a delivery date of the gas cylinder in the supply facility. The predetermined value of the remaining gas amount has been preliminarily set to avoid a situation that the gas cylinder becomes empty. Thus, the determined delivery date enables stable supply of gas delivery, and further, enables reduction in remaining amount of gas to be brought back.

It should be noted that in determining the delivery date, the CPU 301 is configured to determine the delivery date of the gas cylinder when the replacement flag in the storage device is set to "1".

In an example d90 of FIG. 9, the gas cylinder is delivered on August $25^{th}$; the gas meter is read on September $5^{th}$ and October $2^{nd}$; the gas usage from September $5^{th}$ to October $2^{nd}$ is set as 1.16 $m^3$/day (the gas usage N ($m^3$/day) calculated in S103 of FIG. 5); and the remaining gas amount as of October $2^{nd}$ is set as 95.6 $m^3$ (the remaining gas amount updated in S102 of FIG. 5). In FIG. 9, d91 indicates month (date), whereas d92 indicates the remaining gas amount. Further, the gas usage on and after October $2^{nd}$ is set as 1.81 $m^3$/day (the prospective gas usage $\alpha N$ ($m^3$/day) calculated in S103 of FIG. 5), and the amount of gas, remaining when gas is used at a rate of 1.81 $m^3$/day from October $2^{nd}$, is depicted with a dashed line in FIG. 9. As a result, the date that the remaining gas amount in the gas cylinder becomes a predetermined value (e.g., 0), i.e., November $24^{th}$, is determined as the delivery date.

It should be noted that in FIG. 9, when a deliveryman operates the mobile terminal 105 and transmits information indicating completion of delivery of the gas cylinder to the delivery server 101 on August $25^{th}$ as the delivery date, "remaining gas amount" of the gas cylinder is set to an initial value (the value of "gas cylinder capacity" in FIG. 3) in the storage device 307 of the delivery server 101.

As explained above, the delivery server 101 of the present exemplary embodiment is configured to receive meter indication data, predict the prospective remaining gas amount on the basis of sets of meter indication data including the received meter indication data, and determine the date on which the remaining gas amount reaches a predetermined value as the delivery date of a gas cylinder. Accordingly, it is possible to determine the delivery date of a gas cylinder such that gas delivery can be stably supplied, and further, the remaining amount of gas to be brought back can be reduced.

It should be noted that calculation of the gas usage and that of the remaining gas amount are not limited to those of the aforementioned example, and are enabled from various perspectives. For example, when respective gas cylinders of multiple customers are concentrated in a single location (concentrated system), the CPU 301 is also capable of preliminarily grouping the multiple customers connected to the single location, predicting the gas usage and the remaining gas amount for all the intended customers belonging to the same group on the basis of the sum of the gas usages of the respective customers belonging to the same group, and predicting the delivery date of the relevant gas cylinders employing the concentrated system.

Next, explanation will be provided for modifications of the present exemplary embodiment.

Modification 1

With reference to FIG. 5, explanation has been mainly provided above for the process of predicting the remaining gas amount where a single gas cylinder is installed in a supply facility ("number of cylinders"=1 in FIG. 3). Aside from this, chances are that the remaining gas amount is predicted where two gas cylinders are installed in a supply facility ("number of cylinders"=2 in FIG. 3).

In this case, in S102 of FIG. 5, the CPU 301 (the update unit 31) of the delivery server 101 is configured to update the remaining gas amount of each gas cylinder intended to be processed. Further in S103 of FIG. 5, the CPU 301 (the prediction unit 32) of the delivery server 101 is configured to calculate the prospective remaining gas amount of each gas cylinder intended to be processed in the supply facility by predicting the prospective gas usage in each gas cylinder and subtracting the predicted gas usage from the remaining gas amount of each gas cylinder.

Modification 2

Description has not been provided above for change in the past gas usage consumed within the same area as the area that an intended supply facility is located. However, the prospective remaining gas amount may be predicted in accordance with change in the gas usage on an area basis.

In this case, in S103 of FIG. 5, the CPU 301 (the prediction unit 32) of the delivery server 101 is configured to read out all the multiple sets of meter indication data in the same area within a predetermined period from the storage device 307, calculate an average of the rates of change in the aforementioned gas usages on the basis of differences between meter indications in the respective sets of meter indication data, and set the calculated average as a rate of change $\beta$ in the gas usage on an area basis.

For example, when the meter indication date of meter indication data indicates a date in February, the daily gas usage within the same area in February in the previous year and the daily gas usage within the same area in March in the previous year are used as the gas usages within the same area of a predetermined period ago. In this case, the CPU 301 is configured to calculate a value of {(an average of the daily gas usages within the intended area in March in the previous year)/(an average of the daily gas usages within the intended area in February in the previous year)} on the basis of the multiple sets of meter indication data within the intended area and is configured to set the calculated value as the rate of change $\beta$ in the past gas usage consumed within the intended area. In this case, (an average of the daily gas usage within the intended area in February in the previous year) is calculated as, for instance, an average of (the daily gas usages in February in the previous year) for all the intended gas cylinders within the intended area, whereas (an average of the daily gas usage within the intended area in March in the previous year) is calculated as, for instance, an average of (the daily gas usages in March in the previous year) for all the intended gas cylinders within the intended area.

It should be noted that as described above, (the daily gas usage in February in the previous year) of each gas cylinder is calculated by, for instance, a formula {(a meter indication of meter indication data in March in the previous year)−(a meter indication of meter indication data in February in the previous year)}/(the number of days from the meter indication date in February in the previous year to the meter indication date in March in the previous year), whereas (the daily gas usage in March in the previous year) for each gas cylinder is calculated by, for instance, a formula {(a meter indication of meter indication data in April in the previous year)−(the meter indication of the meter indication data in March in the previous year)}/(the number of days from the meter indication date in March in the previous year to the meter indication date in April in the previous year).

In an example d100 of FIG. 10, an average of the daily gas usages within an area 18 in February in the previous year is indicated as 4.0 ($m^3$/day), whereas an average of the daily gas usages within the area 18 in March in the previous year is indicated as 3.0 ($m^3$/day). Hence, the rate of change $\beta$ in the gas usage within the area 18 to be calculated by the CPU 301 is obtained as $\beta$=3.0/4.0. It should be noted that in FIG. 10, the rate of change $\beta$ in the daily gas usage within the area 18 from January in the previous year to February in the previous year is indicated as $\beta$=4.0/3.8. Thus, a rate of increase or decrease in the daily gas usage on an area basis on the same time in the previous year is calculated.

It should be noted that the rate of change in the gas usage on an area basis is not limited to that the previous year, and that in a period of time earlier than the previous year may be used instead.

Furthermore, in S103 of FIG. 5 in the present modification, the CPU 301 (the prediction unit 32) is configured to predict the prospective gas usage in accordance with the rate of change $\alpha$ in the daily gas usage in each gas cylinder and the rate of change $\beta$ in the daily gas usage on an area basis. In this case, for instance, the CPU 301 may be configured to select a greater one of the rates of change, multiply the aforementioned gas usage N ($m^3$/day) in the period from the previous meter indication date to the current meter indication date by the selected rate of change, and set the obtained value as the modified gas usage $\beta$N ($m^3$/day), or alternatively, may be configured to calculate an average of the two rates of change $\alpha$ and $\beta$, multiply the gas usage N ($m^3$/day) by the calculated average, and set the obtained value as the modified gas usage $\{(\alpha+\beta)/2\}$N ($m^3$/day).

It should be noted that, when the two rates of change $\alpha$ and $\beta$ are equal, a preliminarily-set high-prioritized rate of change is configured to be employed and be multiplied by the gas usage N ($m^3$/day).

The invention claimed is:

1. A delivery date determination system of determining a delivery date for a gas cylinder installed in a supply facility, the delivery date determination system comprising:

a delivery server including a central processing unit (CPU), a storage device coupled to the CPU, and a communication control device coupled to the CPU; and one or more mobile terminals communicatively connected to the delivery server, wherein the one or more mobile terminals are configured to:

obtain first meter indication data by reading a readable information code of a gas meter attached to the gas cylinder installed in the supply facility, the first meter indication data including a first customer ID, a first meter number, a first meter reading date, and a first meter indication; and transmit the first meter indication data to the delivery server, wherein the storage device is configured to store:

a plurality of meter indication data, each of the plurality of meter indication data including a customer ID, a meter number, a meter reading date, and a meter indication, and a plurality of remaining gas amount data, each of the plurality of remaining gas amount data including a customer ID, a meter number, and remaining gas amount, wherein the communication control device is configured to receive the first meter indication data, and wherein the CPU is configured to:

obtain second meter indication data from the storage device, the second meter indication data including the first customer ID, the first meter number, and a second meter reading date, the second meter reading date being one month before the first meter reading date;

calculate a gas usage by comparing the first meter indication and a second meter indication included in the second meter indication data;

based on the calculated gas usage, update a first remaining gas amount included in first remaining gas amount data, the first remaining gas amount corresponding to the first customer ID and the first meter number included in the first meter indication data;

obtain third meter indication data and fourth meter indication data from the storage device, the third and fourth meter indication data including the first customer ID and the first meter number, a third meter reading date included in the third meter indication data being one year before the first meter reading date, a fourth meter reading date included in the fourth meter indication data being one month after the third meter reading date;

calculate a rate of change in a past gas usage by comparing a third meter indication included in the third meter indication data and a fourth meter indication included in the fourth meter indication data;

predict a prospective remaining gas amount by reducing the updated the first remaining gas amount on a basis of the rate of change; and determine a date on which the predicted remaining gas amount reaches a predetermined value as the delivery date of the gas cylinder.

2. The delivery date determination system according to claim 1, wherein the storage device is further configured to store a plurality of customer data, each of the plurality of customer data including a customer ID, a meter number, and a gas cylinder capacity, wherein the communication control device is further configured to receive, from the one or more mobile terminals, information indicating the gas cylinder has been delivered, and wherein the CPU is further configured to:

obtain first customer data from the storage device, the first customer data having the first customer ID and the first meter number; and update the first remaining gas amount on a basis of a first gas cylinder capacity included in the first customer data.

* * * * *